Figure 1:
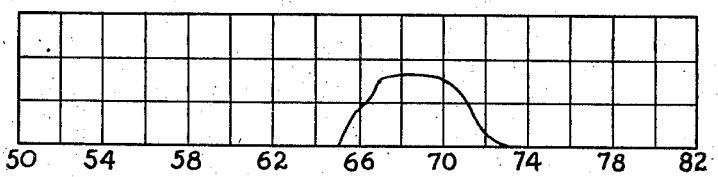

EXAMPLE 1. 10-BROMO-1:1″:3:3:3″:3′-HEXAMETHYL-INDODICARBOCYANINE IODIDE

EXAMPLE 6. 10-BROMO-2:2′-DIETHYL-THIO-DICARBOCYANINE IODIDE

EXAMPLE 7. 10-BROMO-1:1′:3:3:3″:3′-HEXAMETHYL-INDODICARBOCYANINE IODIDE

INVENTORS
Isidor Morris Heilbron
Francis Irving
BY R. L. Johnston
ATTORNEY.

Patented July 16, 1935

2,008,450

UNITED STATES PATENT OFFICE 2,008,450

MANUFACTURE OF SENSITIZED PHOTOGRAPHIC EMULSIONS

Isidor Morris Heilbron and Francis Irving, Liverpool, England, assignors to Imperial Chemical Industries Ltd., a corporation of Great Britain Application January 17, 1931, Serial No. 509,533
In Great Britain January 21, 1930

12 Claims. (Cl. 95—7)

The present invention relates to manufacture of sensitized photographic emulsions; and it comprises a process of rendering photographic emulsions sensitive to red and infra-red light wherein such emulsions are dyed with certain dyes of the polymethine series produced, for example, by the reaction of cyclic ammonium salts containing a reactive methyl group or of the methylene bases of such salts with a compound of the general formula Q.CX:C(Hal).CH:P or with a salt thereof, wherein X is a replaceable monovalent atom or group such as a halogen, hydroxyl, amino, substituted amino, alkoxy or acetoxy group, P is a replaceable divalent atom or radical such as =O, =(OR)$_2$ or =NR (R being alkyl, aryl or aralkyl), and Q is hydrogen or the radical CO$_2$H; and it also comprises the photographic emulsions produced by the described process, said emulsions being sensitive to red and infra-red light and being dyed with dyes of the polymethine series; all as more fully hereinafter set forth and as claimed.

Photographic emulsions sensitive to red and infra-red light have long been a desideratum in the art. We have found that this want can be supplied by dyeing the usual emulsions with certain dyes of well defined structure.

To produce these dyes we cause to interact cyclic ammonium salts containing a reactive methyl group or their methylene base with a compound of the general formula Q.CX:C(Hal).CH:P or a salt thereof, and so obtain new dyestuffs of the polymethine series. In the above formula, X is a replaceable monovalent atom or group such as halogen, amino, or substituted amino, hydroxy, alkoxy or acetoxy, P is a replaceable divalent atom or radical such as O or :NR (R being alkyl, aryl or aralkyl) or (OR)$_2$ (R=Alkyl, etc.) and Q is hydrogen or the radical CO$_2$H.

As compounds of this type which we may employ for the purpose of our invention we may instance, where Q=CO$_2$H, mucochloric acid, CO$_2$H.CCl:CCl.CHO, and mucobromic acid, CO$_2$H.CBr:CBr.CHO; the anilino-compound CO$_2$H.C(NHPh):CCl.CH:NPh, (see Simonis, Berichte der deutschen chem. gesell. 34 (1901) pp. 509-519) and the hydroxy-compound CO$_2$H.C(OH):CCl.CHO (see Hill and Palmer, American Chemical Journal 9, (1887) pp. 147–174. Compare J. C. S. 54, (1888) p. 451).

Where Q=H we have used, for instance, α-chloro- and α-bromo-β- anilinoacrolein-anils (see Simonis Ber. 34, (1901) pp. 509–519, Dieckmann and Platz, Berichte der deutschen chem. gesell. 37 (1904) pp. 4638–4646). These compounds may be employed as their salts, such as their hydrochlorides and hydrobromides, one mol. of which can be condensed with two mols. of the requisite methylene base; or the compound can be used in the form of base and condensed with one mol. of methylene base and one of the corresponding ammonium salt. These compounds are substituted alpha-halogenated acrylic compounds which may be generically represented by the following formula

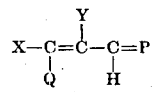

wherein X represents a replaceable monovalent substituent, P represents a divalent substituent, Q represents hydrogen or a carboxylic group and Y represents a halogen.

Our new dyestuffs are basic dyestuffs possessing properties which render them valuable for the ordinary purposes for which such dyestuffs are used. But probably the most valuable use for these new dyestuffs results from our discovery that photographic plates of high sensitivity to red and infra-red light may be obtained by application of our new dyestuffs. Thus we treat a photographic emulsion, such as is sensitive in the untreated state to rays of wave lengths between 360 and 500 millimicrons with, for example, the product of Example 2 below, and obtain an emulsion sensitive well into the infra-red, i. e. beyond 700 millimicrons wave length. The treatment is carried out for example, by bathing a photographic plate with a solution of the said dyestuff in aqueous ethyl alcohol, and subsequently drying it.

Figure 2:
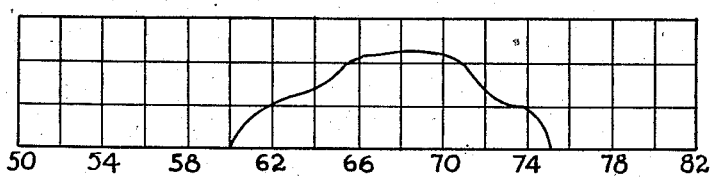
Figure 3:
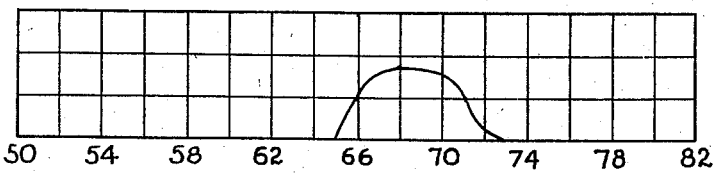

The accompanying drawing illustrates the approximate sensitivity of silver halide emulsions containing some of the dyes herein described, as follows:

Fig. 1—The dye of Example 1;
Fig. 2—The dye of Example 6;
Fig. 3—The dye of Example 7.

It is to be understood that we do not confine ourselves to any particular manner of carrying out our invention, which is illustrated, but not limited in any way, by the following examples, in which the parts are by weight and which illustrate methods of producing dyes which are useful in our invention.

Example 1

10 parts of 1:2:3:3-tetramethylindoleninium iodide and 7 parts of α-bromo-β-anilinoacroleinanil hydrobromide are mixed with 80 parts of acetic anhydride and heated at 90° C. To the brown coloured mixture is now added 4.5 parts of crystalline sodium acetate when the colour immediately becomes deep blue. Heating is continued for about half an hour at the same temperature. When the solution is cooled the dyestuff separates in greenish crystals having a metallic lustre. The product dyes tannined cotton a bright blue shade.

The dyestuff obtained has the probable formula

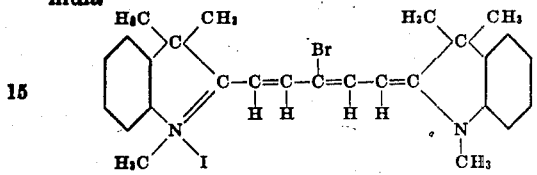

This corresponds to 10-bromo-1:1':3:3:3':3'-hexamethylindodicarbocyanine iodide.

The dyestuff may be prepared as described above and also at a higher temperature, as, for example at the boiling point of the solution. Further, in place of the acetic anhydride, other solvents such as ethyl alcohol, propyl alcohol, pyridine, etc. can be used.

*Example 2*

To 7 parts of α-bromo-β-anilinoacroleinanil hydrobromide in 150 parts of alcohol is added 1.6 parts of anhydrous potassium acetate and, after raising to the boiling point, the mixture is filtered. To the filtrate 10 parts of 1:2:3:3-tetramethlindoleninium iodide in 100 parts of alcohol is added together with a further quantity (1.6 parts) of potassium acetate and the solution is gently boiled under reflux for half-an-hour. On cooling the dyestuff separates as described above.

*Example 3*

10 parts of 1:2:3:3-tetramethylindoleninium iodide, 6 parts of α-chloro-β-anilinoacroleinanil hydrochloride and 3 parts of anhydrous potassium acetate are mixed with 180 parts of absolute alcohol and the whole heated under reflux for 1 hour. On cooling the dye separates as a mass of green crystals. This dyestuff has the probable formula

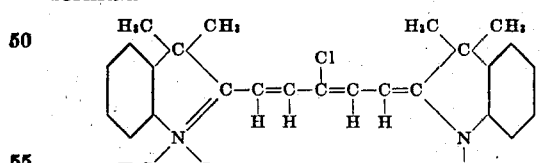

This corresponds to 10-chloro-1:1':3:3:3':3'-hexamethylindodicarbocyanine iodide.

In the above examples the β-anilino-α-halogenoacroleinanils are used in the form of their salts. These, on treatment with alkali give the free compound which can be used in combination with 1 molecular proportion of 1:2:3:3-tetramethyl-indoleninium iodide and 1 molecular proportion of the corresponding methylene base to form the same dyestuff as is obtained by the methods described above.

*Example 4*

1 part of α-bromo-β-anilinoacroleinanil is dissolved in 15 parts of hot absolute alcohol and the solution is treated with 1 part of 1:2:3:3-tetramethylindoleninium iodide. When all has dissolved the methylene base prepared from an equal amount of the indoleninium salt and dissolved in 10 parts of absolute alcohol, is added. The solution is heated at 80° C. for 1 hour during which the colour changes from brown through green to blue. The dyestuff separates on cooling, and is purified if desired by extraction with acetone.

*Example 5*

3 parts of 1:2:3:3-tetramethylindoleninium iodide, 1.8 parts of α-chloro-β-anilinoacrolein, and 1 part of potassium acetate are boiled with 60 parts of absolute alcohol under reflux for 40 minutes. On cooling the dye crystallizes out as described in Example 3.

*Example 6*

To a solution of 7 parts of β-anilino-α-bromo-acroleinanil hydrobromide in 300 parts of hot alcohol 10 parts of 2-methylbenzthiazole ethyliodide are added. The reddish-brown solution is then treated with 3.2 parts of anhydrous potassium acetate. The solution, which becomes green in colour, is refluxed for 30 minutes. The dyestuff separates in green crystals. It has the probable formula

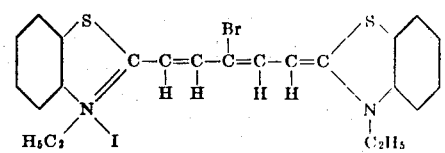

This corresponds to 10-bromo-1:1'-diethyl-thiodicarbocyanine iodide and its sensitized maximum lies at 690 millimicrons.

*Example 7*

To a solution of 10 parts of 1:2:3:3-tetramethyl-indoleninium iodide in 240 parts of hot absolute alcohol, 4.3 parts of mucobromic acid is added. On treating the reddish-brown solution with 3.3 parts of anhydrous potassium acetate a green colour develops immediately. The solution is refluxed for 30 minutes. On cooling the dyestuff separates. This dyestuff has the probable formula

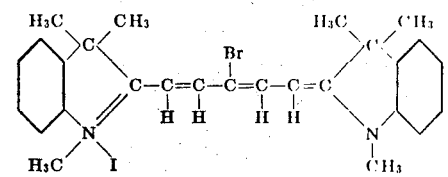

This corresponds to 10-bromo-1:1':3:3:3':3'-hexamethylindodicarbocyanine iodide.

Any of the dyes produced by the processes outlined in the above examples are useful in dyeing photographic emulsions according to our invention. The dyes which are particularly advantageous in our process can be represented by the general formula

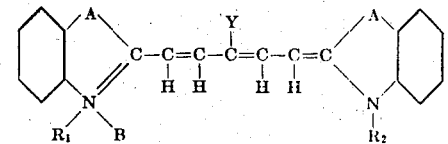

wherein $R_1$ and $R_2$ represent an alkyl group, Y represents halogen, B represents a mono-valent acid radical and A represents a structure of the class consisting of

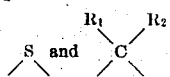

The actual dyeing operation is accomplished by simply bathing a photographic plate or film in a solution of the dyestuff. Various densities of coloration may be obtained according to the effects desired. In all cases an important effect obtained is an enhanced sensitivity to red and infra-red light.

As many apparently widely different embodiments of this invention may be made without departing from the spirit thereof, it is to be understood that we do not limit ourselves to the foregoing examples or descriptions except as indicated in the following claims:

We claim—

1. In the manufacture of sensitized silver halide photographic emulsions, the process which comprises dyeing said emulsions with a dye having the probable formula:

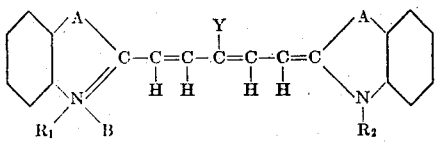

wherein $R_1$ and $R_2$ represent alkyl groups, Y represents halogen, B represents a monovalent acid radical and A represents a structure of the class consisting of

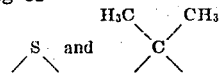

2. The process of claim 1 wherein the dye employed has a formula in which A represents $=C(CH_3)_2$, $R_1$ and $R_2$ represent $-CH_3$ and B represents $-I$.

3. The process of claim 1 wherein the dye employed has a formula in which A represents $=S$, $R_1$ and $R_2$ represent $-C_2H_5$ and B represents $-I$.

4. A silver halide photographic emulsion sensitive to red and infra-red light, said emulsion being dyed with a dye having the formula of claim 1.

5. A silver halide photographic emulsion sensitive to red and infra-red light, said emulsion being dyed with a dye of the polymethine series having the probable formula

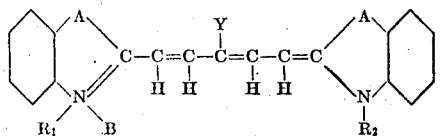

wherein $R_1$ and $R_2$ represent alkyl groups, Y and B represent halogen and A represents a structure of the class consisting of

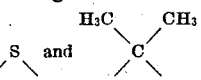

6. A silver halide photographic emulsion sensitive to red and infra-red light, said emulsion being dyed with a dye of the polymethine series having the probable formula of claim 5 wherein A represents $=S$, $R_1$ and $R_2$ represent $-C_2H_5$ and B represents $-I$.

7. A silver halide photographic emulsion sensitive to red and infra-red light, said emulsion being dyed with a dye of the polymethine series, said dye having the probable formula

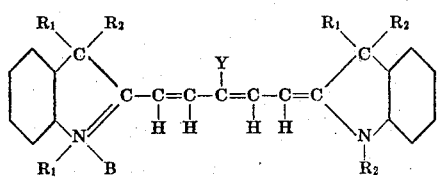

wherein $R_1$ and $R_2$ represents an alkyl group, Y represents a halogen and B represents a mineral acid residue.

8. A silver halide photographic emulsion sensitive to red and infra-red light, said emulsion being dyed with 10-halogeno-1:1':3:3:3':3'-hexaalkylindodicarbocyanine halide.

9. A silver halide photographic emulsion sensitive to red and infra-red light, said emulsion being dyed with 10-bromo-1:1'-dialkyl-3:3:3':3'-tetramethylindodicarbocyanine iodide.

10. A silver halide photographic emulsion sensitive to red and infra-red light, said emulsion being dyed with 10-chloro-1:1':3:3:3':3'-hexamethylindodicarbocyanine iodide.

11. A silver halide photographic emulsion sensitive to red and infra-red light, said emulsion being dyed with a 10-halogeno-2:2'-dialkylthiodicarbocyanine halide.

12. A silver halide photographic emulsion sensitive to red and infra-red light, said emulsion being dyed with 10-bromo-2:2'-diethylthiodicarbocyanine iodide.

ISIDOR M. HEILBRON.
FRANCIS IRVING.